(12) United States Patent
    Fu et al.

(10) Patent No.: US 11,194,428 B2
(45) Date of Patent: Dec. 7, 2021

(54) TOUCH SCREEN, PRESSURE-SENSITIVE TOUCH METHOD, AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Zhaohong Fu, Beijing (CN); Rui Guo, Beijing (CN); Zhiming Meng, Beijing (CN); Jianzi He, Beijing (CN); Junning Su, Beijing (CN); Xiaokang Hou, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/822,598

(22) Filed: Mar. 18, 2020

(65) Prior Publication Data
    US 2021/0064163 A1    Mar. 4, 2021

(30) Foreign Application Priority Data
    Aug. 30, 2019  (CN) .......................... 201910812291.7

(51) Int. Cl.
    *G06F 3/044*       (2006.01)
    *G06F 3/041*       (2006.01)

(52) U.S. Cl.
    CPC ............ *G06F 3/044* (2013.01); *G06F 3/0416* (2013.01); *G06F 2203/04105* (2013.01)

(58) Field of Classification Search
    CPC ................... G06F 3/044; G06F 3/0416; G06F 2203/04105
    See application file for complete search history.

(56) References Cited

U.S. PATENT DOCUMENTS

| 2010/0177060 | A1* | 7/2010 | Han ........................ G06F 3/042 |
| | | | 345/174 |
| 2014/0145150 | A1* | 5/2014 | de Jong ............. H01L 27/3276 |
| | | | 257/40 |
| 2018/0129798 | A1* | 5/2018 | He .......................... G06F 3/042 |
| 2018/0150671 | A1* | 5/2018 | Choo ..................... H01L 27/323 |
| 2019/0079628 | A1* | 3/2019 | Liu ...................... G06F 3/04144 |

\* cited by examiner

*Primary Examiner* — Chanh D Nguyen
*Assistant Examiner* — Ngan T. Pham-Lu
(74) *Attorney, Agent, or Firm* — Kinney & Lange, P.A.

(57) ABSTRACT

The present disclosure provides a touch screen and a pressure-sensitive touch method, and a display apparatus. In one embodiment, a touch screen includes: a touch sensing layer including a touch sensing area configured to sense touch information of a touch action; a pressure sensing layer including a pressure sensing area including a plurality of photosensitive devices therein, the pressure sensing area configured to sense pressure information of the touch action, the photosensitive devices being configured to receive optical signals from a light-emitting side of the touch screen and convert the optical signals into electrical signals; and a processor configured to process the electrical signals converted by the photosensitive devices and output corresponding pressure information, the pressure information at least comprising a pressure strength of the touch action.

11 Claims, 2 Drawing Sheets

TOUCH SCREEN, PRESSURE-SENSITIVE TOUCH METHOD, AND DISPLAY APPARATUS

CROSS-REFERENCE TO RELATED APPLICATION

This application claims priority to Chinese Patent Application No. 201910812291.7 filed on Aug. 30, 2019 in the State Intellectual Property Office of China, the disclosure of which is hereby incorporated by reference in its entirety.

TECHNICAL FIELD

The present disclosure generally relates to the field of display technology, and particularly, to a touch screen and a pressure-sensitive touch method, and a display apparatus.

BACKGROUND

With the rapid development of portable electronic terminal equipment (especially mobile phones and tablets) technology, more and more new technologies are applied to the terminal equipment. Force Touch (Pressure-sensitive Touch) technology is called a great change after multi-touch. In addition to tapping and clicking functions of the Force Touch, 3D-Touch adds the function of "high pressure strength". Using pressure-sensitive touch technology, the terminal device can not only recognize each touch action of the user, but also sense the strength of the touch action, and can give different feedback based on the strength of the touch action.

At present, realization of the pressure-sensitive touch function requires a layer of film material to be used as a pressure sensing layer on the back of the display module or other locations, and the pressure sensing layer needs to be controlled by an independent chip, which makes the structure of the display apparatus complicated and the manufacturing costs increased.

SUMMARY

According to an aspect of the present disclosure, there is provided a touch screen comprising:

a touch sensing layer including a touch sensing area configured to sense touch information of a touch action;

a pressure sensing layer including a pressure sensing area comprising a plurality of photosensitive devices therein, the pressure sensing area configured to sense pressure information of the touch action, the photosensitive devices being configured to receive optical signals from a light-emitting side of the touch screen and convert the optical signals into electrical signals; and a processor configured to process the electrical signals converted by the photosensitive devices and output corresponding pressure information, the pressure information at least comprising a pressure strength of the touch action.

In some embodiments, the touch screen further comprises: a plurality of thin film transistors connected with the plurality of photosensitive devices, respectively, and configured to drive the plurality of photosensitive devices.

In some embodiments, each of the photosensitive devices comprises: a first electrode, a second electrode, and a photodiode between the first electrode and the second electrode; the first electrode is configured as a conductive metal and is connected with the thin film transistor; the second electrode is configured as a transparent electrode and is configured to transfer the optical signal from the light-emitting side of the touch screen; and the photodiode is configured to receive the optical signal and convert the optical signal into the electrical signal.

In some embodiments, the photodiode is a PIN-type photodiode or a PN-type photodiode.

In some embodiments, a size of the pressure sensing area is not less than a size of the touch sensing area.

In some embodiments, the plurality of thin film transistors and the plurality of photosensitive devices are arranged in a same layer.

In some embodiments, the touch screen is a projected capacitive screen.

According to another aspect of the present disclosure, there is provided a pressure-sensitive touch method comprising:

sensing a touch signal of a touch action occurred in a touch sensing area, to obtain touch information of the touch action;

scanning an electrical signal value of a photosensitive device located in a region where the touch signal occurs when the touch signal occurs, and taking the electrical signal value as a first signal value;

continuously scanning a current electrical signal value of the photosensitive device located in the region where the touch signal occurs, and obtaining a change amount of the current electrical signal value relative to the first signal value, and obtaining pressure information of the touch action according to the change amount; and sending the touch information and the pressure information to a controller, and outputting a corresponding control command by the controller.

In some embodiments, the touch information comprises at least one of a touch position, a touch duration, or a touch gesture; and the pressure information at least comprises a pressure strength.

In some embodiments, obtaining a change amount of the current electrical signal value relative to the first signal value, further comprises: performing a difference operation between the current electrical signal value and the first signal value, and taking a result of the difference operation as the change amount.

In some embodiments, sensing a touch signal of a touch action occurred in a touch sensing area, further comprises: sensing a capacitance value of each sensing unit in the touch sensing area under a condition that there is no touch signal in the touch sensing area, and taking the capacitance value as a first capacitance value; and determining whether there is the touch signal occurred in the touch sensing area according to a change of a current capacitance value relative to the first capacitance value of each sensing unit in the touch sensing area.

In some embodiments, determining whether there is the touch signal occurred in the touch sensing area according to a change of a current capacitance value relative to the first capacitance value of each sensing unit in the touch sensing area, further comprises: determining that there is no touch signal in the touch sensing area if the current capacitance value of each sensing unit in the touch sensing area is unchanged relative to the first capacitance value; and determining that there occurs the touch signal in a certain sensing unit of the touch sensing area if the current capacitance value of the certain sensing unit in the touch sensing area decreases relative to the first capacitance value.

According to yet another aspect of the present disclosure, there is provided a display apparatus comprising the touch screen of any one of the abovementioned embodiments.

DETAILED DESCRIPTION OF THE EMBODIMENTS

Figure 1:
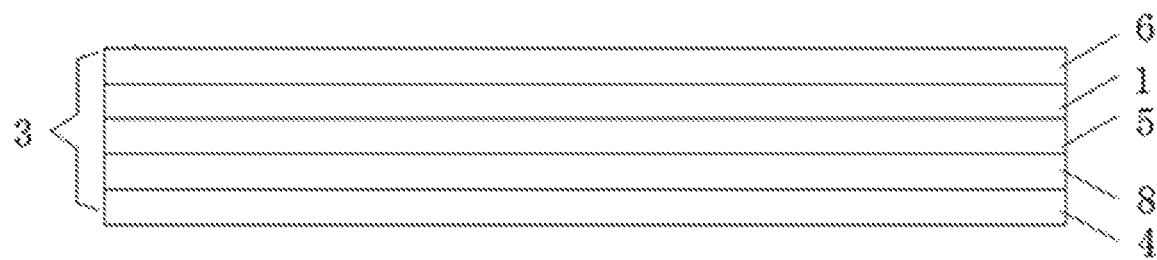
FIG. 1 is a schematic view showing a structure of a touch screen according to an embodiment of the present disclosure.

In order to further explain the technical measures and effects adopted by the present disclosure to achieve the intended purposes, the specific implementations, structures, characteristics and effects of a touch screen, a pressure-sensitive touch method, and a display apparatus according to the present disclosure are described in detail below with reference to the accompanying drawings and exemplary embodiments.

As shown in FIG. 1 to FIG. 4, according to embodiments of the present disclosure, there is provided a touch screen 3. The touch screen 3 comprises: a touch sensing layer 1 including a touch sensing area configured to sense touch information of a touch action; a pressure sensing layer 8 including a pressure sensing area comprising a plurality of photosensitive devices 2 therein, the pressure sensing area configured to sense pressure information of the touch action, the photosensitive devices 2 being configured to receive optical signals from a light-emitting side of the touch screen 3 and convert the optical signals into electrical signals; and a processor configured to process the electrical signals converted by the photosensitive devices 2 and output corresponding pressure information, the pressure information at least comprising a pressure strength of the touch action.

It should be noted that the touch screen 3 according to the embodiments of the present disclosure may be designed on the basis of a projected capacitive screen. In order to more clearly introduce the touch screen proposed above in the present disclosure and the pressure-sensitive touch method and display apparatus to be described below, the structure and the touch principle of the projected capacitive screen are briefly described first. The main structure required by a projected capacitive screen to implement the touch function includes a touch sensing layer. The touch sensing layer usually includes a plurality of rows of driving lines and a plurality of columns of sensing lines fabricated on a substrate. Each row of driving lines is formed by a plurality of driving electrodes in series. Each column of sensing lines is formed by a plurality of sensing electrodes in series. The plurality of rows of driving lines and the plurality of columns of sensing lines cross each other to form a plurality of intersections uniformly distributed on the touch screen. The sensing electrodes and the driving electrodes form capacitors at the intersections. By sequentially scanning each driving line and receiving a sensing signal through each sensing line, the capacitance value at each intersection can be sensed. When a finger touches the projected capacitive screen, a capacitance is generated between the finger and the sensing electrode, and a part of the charge is lost by the finger, resulting in a decrease in the capacitance at the touch position. Therefore, by detecting the change in capacitance at each intersection, coordinate of the touch position can be determined. Projected capacitive screens are divided into self-capacitive touch screen and mutual-capacitive touch screen according to their scanning methods. Self-capacitive touch screen can only perform single-point touch, while mutual-capacitive touch screen can implement multi-touch.

In the touch screen 3 according to the embodiments of the present disclosure, the touch sensing layer 1 may adopt the structure of the touch sensing layer in the projected capacitive screen to implement the touch sensing function. At the same time, the touch screen 3 according to the embodiments of the present disclosure, in addition to the above-mentioned structure for realizing the touch-sensing function, also includes a pressure sensing layer 8 comprising a plurality of photosensitive devices 2 therein for implementing a pressure-sensitive touch function.

Figure 2:
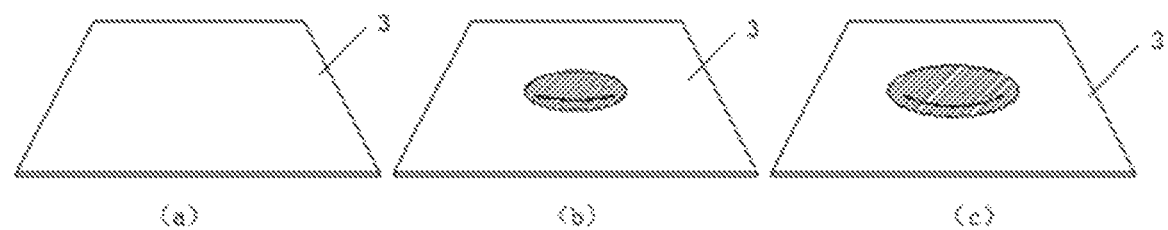
FIG. 2 is a schematic view showing that a touch screen according to an embodiment of the present disclosure is pressed with different pressure forces.
Figure 3:
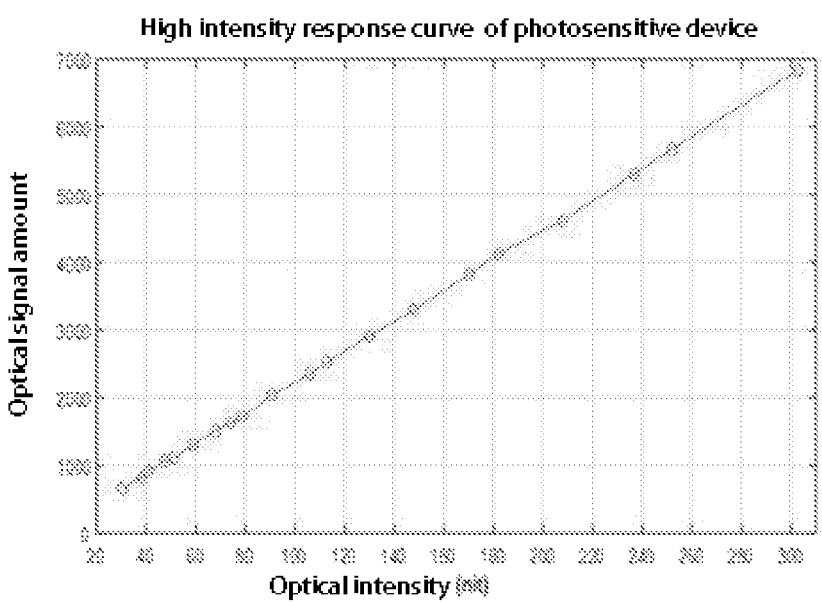
FIG. 3 is a curve diagram showing signal change of a photosensitive device of a touch screen according to an embodiment of the present disclosure within a range of 0-300 nit.

Specifically, the touch screen 3 according to the embodiments of the present disclosure can sense the strength of a touch action through the pressure-sensitive touch function, so that the controller can provide different feedback according to the strength of the touch action, that is, the different strengths of the touch action correspond to different touch information of the controller. As shown in FIG. 2, when the finger presses against the touch screen 3, as the pressure strength of the finger increases, the region where the finger covers the touch screen 3 also increases (in FIG. 2, (a) indicates that the touch screen 3 is in an non-pressure state, (b)-(c) respectively indicate schematic diagrams showing pressure strengths of the touch action on the touch screen 3 with the finger gradually increase, wherein the shadow in the figure is the region where the finger covers the touch screen 3, and the arc in the shadow represents the pressure strength), as a result, the photometric change is received by the sensitive device 2 in the region touched by the finger. FIG. 3 shows signal change of the photosensitive device 2 within a range of 0-300 nit. It can be seen from FIG. 3 that signal change of the photosensitive device 2 within the range of 0-300 nit is basically linear. Specifically, the photosensitive device 2 receives the ambient light from the light-emitting side of the touch screen 3, and converts the received optical signal into the electrical signal, and the electrical signal is processed by the processor. Therefore, the change of the pressure strength of the finger can be determined according to the change of the optical signal value received by the sensitive device 2 in the region touched by the finger. When the finger touches the touch screen 3, the finger blocks the light received by the sensitive device 2 in the touch region, and when the finger presses against the touch region with pressure strength, as the pressure strength increases, size of the region touched by the finger increases accordingly. A change of the optical signals received by one or more photosensitive devices 2 in the region touched by the finger causes the electrical signal converted by the photosensitive device 2 in the region to change. The processor can receive and process the electrical signal converted by the photosensitive device 2, and generates pressure information according to the change of the electrical signal. The pressure information herein comprises at least the pressure strength. The processor sends the pressure information to the controller of a mobile terminal. Different pressure information corresponds to different control commands of the controller, which can cause the controller to respond. The rule for generating above-mentioned control commands of the controller may be set in advance, that is, what range of pressure information can be set in advance to correspond to what kind of control command. The processor herein can be a microcontroller (MCU) or a touch IC.

In addition, in the touch screen according to the embodiments of the present disclosure, when the photosensitive device 2 is working, the light emitted from the backlight or the pixel light emitting layer of the display panel where the touch screen 3 is located will also affect the operation of the photosensitive device 2. These factors are taken into consideration. Considering that the display panel requires its display brightness to be constant to a certain extent, the interference of light emitted from the backlight or the pixel light-emitting layer of the display panel can be removed during the sensing of the photosensitive device 2 and the data processing stage of the processor, thereby the main factor that affects the operation of the photosensitive device 2 is the ambient light from the light-emitting side of the touch screen 3.

In order to realize the accurate pressure-sensitive touch function of the touch screen, in the touch screen according to the embodiments of the present disclosure, the plurality of photosensitive devices 2 can be uniformly set at the touch sensing area of the touch sensing layer 1. The specific number of photosensitive devices 2 may be set according to the size of the touch screen and more specifically according to the size of the touch sensing area. If the conditions such as the process condition allow, as many photosensitive devices 2 as possible can be set, to improve the accuracy of the pressure-sensitive touch. According to different structural settings of the touch screen 3, the setting position of the photosensitive devices 2 in the touch screen can be different, and it can be set according to the actual situation. For example, in the embodiment shown in FIG. 1, the touch screen 3 includes a TFT array substrate 4, and a color film glass 5, the touch sensing layer 1, and a color film 6 laminated on the TFT array substrate 4. The pressure sensing layer 8 comprising the plurality of photosensitive devices 2 therein can be disposed between the TFT array substrate 4 and the color filter glass 5, and the plurality of photosensitive devices 2 are respectively connected with the array of TFTs on the TFT array substrate 4.

Figure 4:
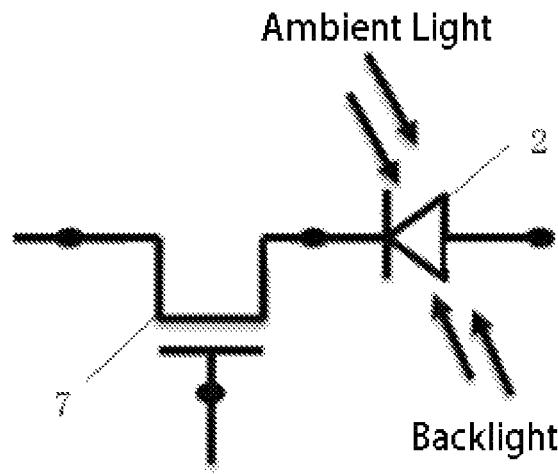
FIG. 4 is a schematic diagram showing a structure of the sensitive device of a touch screen according to an embodiment of the present disclosure.

Specifically, as shown in FIG. 4, the touch screen according to the present embodiment further includes: a plurality of thin film transistors (TFT) 7. The plurality of thin film transistors 7 are respectively connected with the plurality of photosensitive devices 2, for driving the photosensitive devices 2. The thin film transistors 7 herein may also be thin film transistors 7 for driving pixels in a display apparatus. The thin film transistors 7 are used as "switches" for driving the photosensitive devices 2, and the photosensitive devices 2 are driven to complete the process of light sensing scanning. The thin film transistors 7 and the photosensitive devices 2 together constitute a component that realizes light sensing detection. Specifically, the thin film transistor 7 can be connected with the photosensitive device 2 through its drain. In some embodiments, where the processing circuit and the signal processor allow, the plurality of photosensitive devices can also be directly set in the TFT array substrate, in this case, the pressure sensing layer is incorporated into the TFT array substrate, that is, the plurality of thin film transistors are disposed in the same layer as the plurality of photosensitive devices.

The above-mentioned photosensitive device can have various specific setting forms. For example, a photosensitive device may include a first electrode, a second electrode, and a photodiode between the first electrode and the second electrode; the first electrode is configured as a conductive metal and is connected with the thin film transistor; and the second electrode is configured as a transparent electrode and is configured to transfer the optical signal from the light-emitting side of the touch screen; and the photodiode is configured to receive the optical signal and convert the optical signal into the electrical signal. The photodiode may be a PIN-type photodiode. In the PIN-type photodiode, a low-doped intrinsic layer of semiconductor is added between a P-type semiconductor material and an N-type semiconductor material. Compared with general photodiode, it has higher sensitivity and the time required will be shortened. In addition, the photodiode can also be a PN-type photodiode, etc., as long as it can achieve a reliable conversion between the optical signal and the electrical signal, and there is no specific limitation herein.

Specifically, the plurality of photosensitive devices 2 constitutes a pressure sensing area of a pressure sensing layer 8 for implementing the pressure-sensitive touch function of the touch screen 3. In order to increase the size of the pressure-sensitive touch region of the touch screen 3, the size of the pressure sensing area can be larger than the size of the touch sensing area, or the size of the pressure sensing area can be equal to the size of the touch sensing area.

With the touch screen according to the embodiments of the present disclosure, when the finger presses against the touch screen, as the strength of the finger pressing the touch screen increases, an area of the region where the finger covers the touch screen will increase accordingly. Therefore, during the process of pressing the touch screen by the finger, value of the optical signal received by the photosensitive device in the region where the finger presses will change. The photosensitive device can convert the received optical signal into an electrical signal. The processor can receive and process the electrical signal converted by the photosensitive device, and form a pressure information based on the change in the electrical signal. The pressure information corresponds to the control command of the controller. The processor sends the pressure information to the controller, which can cause the controller to respond to achieve the pressure-sensitive touch function of the touch screen. In the embodiments of the present disclosure, the photosensitive devices are provided in the touch screen to realize the pressure-sensitive touch function of the touch screen. Compared with the related art in which a layer of film is added to the back or other positions of the display module as the pressure sensing layer and an independent chip is used to control the pressure sensing layer, the touch screen according to the embodiments of the present disclosure can simplify the structure of the display apparatus and reduce the manufacturing cost of the touch screen. In addition, the application of the pressure-sensitive touch technology in the related art is limited by the characteristics of the material, and the size of the touch screen applied does not exceed 15 inches, which cannot be used on a large-sized touch screen, however, the structure of the touch screen according to the embodiments of the present disclosure to realize the pressure-sensitive touch technology is not limited by the size of the touch screen, and thus can be applied to a large-sized touch screen.

Figure 5:
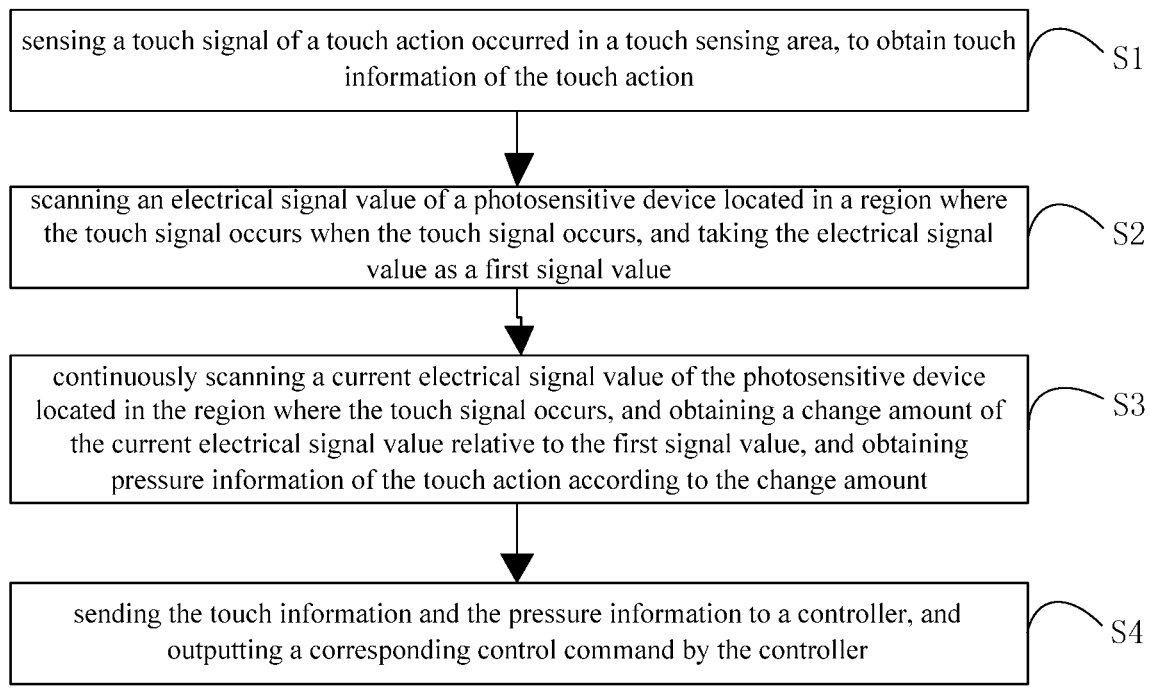
FIG. 5 is a schematic flowchart of a pressure-sensitive touch method according to an embodiment of the present disclosure.

As shown in FIG. 5, according to another embodiment of the present disclosure, there is provided a pressure-sensitive touch method. The pressure-sensitive touch method comprises the following steps.

A step S1 is to sense a touch signal of a touch action occurred in a touch sensing area, to obtain touch information of the touch action.

Specifically, when a pressure-sensitive touch is implemented, a touch signal in the touch sensing area is first sensed through the touch sensing layer 1, that is, it is determined whether a touch signal occurs in the touch sensing area. If a touch signal occurs, touch information corresponding to the touch signal is obtained. The touch information may include information such as a touch position, a touch gesture, and a touch duration.

When a finger performs a pressure-sensitive touch operation on the touch screen 3, from the time when the finger touches the touch screen 3 to the time when the touch operation is completed, the contact area of the finger with the touch screen 3 will increase gradually as the pressure strength of the finger pressing against the touch screen 3 increases, that is, the region covering the touch screen 3 will also increase. Therefore, during pressing the touch screen 3 with a finger, value of the optical signal received by the photosensitive device 2 in the contact area of the finger will change, and the photosensitive device 2 can convert the received optical signal into an electrical signal, and the change of the pressure strength of the finger can be obtained according to the change of the value of the optical signal converted by the photosensitive device 2. Therefore, in the pressure-sensitive touch operation, when the finger touches the touch screen 3, the optical signal received by the photosensitive device 2 in the finger pressing region has an initial value, that is, the value of electrical signal converted by the photosensitive device 2 at the moment can be the initial value, when value of the current electrical signal converted by the photosensitive device 2 in the finger pressing region during the finger pressing process is compared with the initial value, the change amount of the value of the electrical signal converted by the photosensitive device during the pressure-sensitive touch process can be obtained. The specific steps are as follows.

A step S2 is to scan an electrical signal value of a photosensitive device 2 located in a region where the touch signal occurs when the touch signal occurs, and take the electrical signal value as a first signal value.

A step S3 is to continuously scan a current electrical signal value of the photosensitive device 2 located in the region where the touch signal occurs, and obtain a change amount of the current electrical signal value relative to the first signal value, and obtain pressure information of the touch action according to the change amount.

Specifically, when it is determined that a touch signal occurs in the touch sensing area through the sensing of the touch sensing layer 1, the value of the electrical signal converted by the photosensitive device 2 in the region where the touch signal occurs is scanned when the touch signal occurs, and the value of the electrical signal is taken as a first signal value, namely an initial value. During pressing the touch screen 3 with a finger, the region where the touch signal occurs refers to an area where the touch action, that is, the pressure-sensitive touch operation performed by the finger, contacts with the touch screen 3. A current electrical signal value converted by the photosensitive device 2 located in the region where the touch signal occurs is continuously scanned, and a change amount of the current electrical signal value obtained by continuously scanning relative to the first signal value is obtained by comparing the current electrical signal value obtained by continuously scanning with the first signal value. The process of obtaining the change amount is implemented by the processor, and the processor obtains corresponding pressure information according to the change amount. The pressure information at least comprises a pressure strength applied by the touch action on the touch screen.

A step S4 is to send the touch information and the pressure information to a controller, and output a corresponding control command by the controller.

The controller sends the touch information and the pressure information to the controller, and the controller will receive information such as the touch position, the touch duration, the touch gesture, and the pressure strength. The pressure information corresponds to the control commands of the controller. When the pressure information is received by the controller, the controller can output the corresponding control command. The rule for generating above-mentioned control commands may be set in advance. Specifically, what range of pressure information can be set in advance to correspond to what kind of control command. For example, if the pressure strength is set to "high pressure strength" in the first range, and the "high pressure strength" corresponds to the first control command of the controller, the pressure strength included in the pressure information corresponding to the touch signal after sensing is within the first range. Then the controller outputs the first control command.

The rules for generating the above control commands may be set in advance. Specifically, what range of pressure information can be set in advance to correspond to what kind of control command. For example, the pressure strength in a first range is set to "high pressure strength", the high pressure strength corresponds to a first control command of the controller. Once the pressure strength contained in the corresponding pressure information after sensing of the touch action falls within the first range, then the controller will output the first control command.

With the pressure-sensitive touch method according to the embodiments of the present disclosure, a touch signal in the touch sensing area is sensed through the touch sensing layer to obtain corresponding touch information. Through the change amount of the current electrical signal value converted by the photosensitive device relative to the first signal value, pressure information of the touch action is obtained. The pressure information corresponds to the control command of the controller. The processor sends the pressure information and the touch information to the controller, which can cause the controller to respond to achieve the pressure-sensitive touch function of the touch screen. In the pressure-sensitive touch method according to the embodiments of the present disclosure, the photosensitive devices are provided in the touch screen to realize the pressure-sensitive touch function of the touch screen. Compared with the related art in which a layer of film is added to the back or other positions of the display module as the pressure sensing layer and an independent chip is used to control the pressure sensing layer, the touch screen according to the embodiments of the present disclosure can simplify the structure of the display apparatus and reduce the manufacturing cost of the touch screen.

Specifically, the abovementioned touch information comprises at least one of a touch position, a touch duration, or a touch gesture; and the pressure information at least comprises a pressure strength. When the processor outputs information to the controller, it outputs the combined information of touch information and pressure information. Touch information can provide information such as the position, the duration, and the gesture of pressure-sensitive touch, that is, the combined output of the touch information and the pressure information realizes accuracy of pressure-sensitive touch.

Specifically, in the step S3, obtaining a change amount of the current electrical signal value relative to the first signal value, further comprises: performing a difference operation between the current electrical signal value and the first signal value, and taking a result of the difference operation as the change amount.

Taking the first signal value as a reference, the current electrical signal value obtained by the scanning can be subjected to a differential operation using the first signal value, and pressure information of the touch action can be obtained according to the difference operation result. Considering that in actual use, the touch region corresponding to the touch signal will not always be at the region where the photosensitive device performs best. The absolute change of the signal amount formed by the position of the blind zone cannot be sensed, causing problems such as misjudgment or insensitivity of the pressure strength. Differential operation of relative signal amount can make the sensing more accurate. At the same time, flexible addition of algorithms during the calculation and processing can more flexibly deal with the unevenness of the various regions of the touch screen in actual use.

Specifically, the abovementioned step S1 further comprises: a step S1l of sensing a capacitance value of each sensing unit in the touch sensing area under a condition that there is no touch signal in the touch sensing area, and taking the capacitance value as the first capacitance value; and a step S12 of determining if there is a touch signal occurred in the touch sensing area according to a change of a current capacitance value relative to the first capacitance value of each sensing unit in the touch sensing area.

The sensing of the touch signal is to sense whether there is a touch signal occurred in the touch sensing area, which is implemented by the touch function layer 1. The working principle of the touch sensing layer 1 is as follows. When a finger touches the touch screen 3, a capacitance is generated between the finger and the sensing electrode, a part of the charges is lost by the finger, causing the capacitance at the touch position to decrease. Therefore, in the state where no touch signal is present in the touch sensing area, the capacitance value of each sensing unit is taken as the first capacitance value, that is, as the initial value. The sensing units may be a plurality of uniformly distributed intersections formed by the plurality of rows of driving lines and the plurality of columns of sensing lines crossing each other in the touch sensing area. During the sensing process, the current capacitance value of each sensing unit in the touch sensing area is compared with the first capacitance value in real time, and whether a touch signal occurs in the touch sensing area or not can be determined based on the change of the current capacitance value of each sensing unit relative to the first capacitance value.

Specifically, the abovementioned step S12 further comprises: a step S121 of determining that there is no touch signal in the touch sensing area if the current capacitance value of each sensing unit in the touch sensing area is unchanged relative to the first capacitance value; and a step S121 of determining that there occurs the touch signal in a certain sensing unit of the touch sensing area if the current capacitance value of the certain sensing unit in the touch sensing area decreases relative to the first capacitance value.

Based on the working principle of the touch sensing layer, a specific method for determining whether there is a touch signal in the touch sensing area is to compare the current capacitance value of each sensing unit in the touch sensing area with the first capacitance value in real time. If the current capacitance value of each sensing unit is equal to the first capacitance value and there is no change, it can be determined that no touch signal occurs in the touch sensing area. If the current capacitance value of a certain sensing unit in the touch sensing area is reduced relative to the first capacitance value, it can be determined that a touch signal occurs in the sensing unit of the touch sensing area, and the coordinate position of the touch signal can be determined by the coordinates corresponding to the sensing unit. The sensing units herein can be a plurality of intersections evenly formed by the plurality of rows of driving lines and the plurality of columns of sensing lines crossing each other in the touch sensing area.

According to yet another embodiment of the present disclosure, there is provided a display apparatus comprising the touch screen according to any one of the abovementioned embodiments.

Specifically, the display apparatus may be an electronic apparatus with a display function, such as a television, a mobile phone, and a tablet computer. The pressure-sensitive touch function of the display apparatus may be implemented through the touch screen 3 described above.

With the display apparatus according to the embodiments of the present disclosure, the photosensitive devices are provided in the touch screen to realize the pressure-sensitive touch function of the touch screen. Compared with the related art in which a layer of film is added to the back or other positions of the display module as the pressure sensing layer and an independent chip is used to control the pressure sensing layer, the display apparatus according to the embodiments of the present disclosure can simplify the structure of the display apparatus and reduce the manufacturing cost of the display apparatus. In addition, the application of the pressure-sensitive touch technology in the related art is limited by the characteristics of the material, and the size of the display apparatus applied does not exceed 15 inches, which cannot be used on a large-sized display apparatus, however, the structure of the display apparatus according to the embodiments of the present disclosure to realize the pressure-sensitive touch technology is not limited by the size of the touch screen, and thus can be applied to a large-sized display apparatus.

The above is only specific embodiments of the present disclosure, but the protection scope of the present disclosure is not limited to this. Changes or replacements easily envisaged by those skilled in the art in the technical scope disclosed in the present disclosure fall into the protection scope of the present disclosure. Therefore, the protection scope of the present disclosure shall be subject to the protection scope of the claims.

What is claimed is:

1. A touch screen comprising:
   a touch sensing layer including a touch sensing area configured to sense touch information of a touch action;
   a TFT array substrate comprising a pressure sensing layer and a plurality of thin film transistors for driving pixels, wherein:
   the pressure sensing layer includes a pressure sensing area having a plurality of photosensitive devices therein, the plurality of thin film transistors and the plurality of photosensitive devices are arranged in a same layer, and the plurality of thin film transistors are connected with the plurality of photosensitive devices, respectively, and are configured to drive the plurality of photosensitive devices; and the pressure sensing area is configured to sense pressure information of the touch action, and the plurality of photosensitive devices are configured to receive optical signals from a light-emitting side of the touch screen and convert the optical signals into electrical signals; and a processor configured to process the electrical signals converted by the photosensitive devices and output corresponding pressure information, the pressure information at least comprising a pressure strength of the touch action.

2. The touch screen of claim 1, wherein:

each of the photosensitive devices comprises: a first electrode, a second electrode, and a photodiode between the first electrode and the second electrode;

the first electrode is configured as a conductive metal and is connected with the thin film transistor;

the second electrode is configured as a transparent electrode and is configured to transfer the optical signal from the light-emitting side of the touch screen; and the photodiode is configured to receive the optical signal and convert the optical signal into the electrical signal.

3. The touch screen of claim 2, wherein:

the photodiode is a PIN-type photodiode or a PN-type photodiode.

4. The touch screen of claim 1, wherein:

a size of the pressure sensing area is not less than a size of the touch sensing area.

5. The touch screen of claim 1, wherein:

the touch screen is a projected capacitive screen.

6. A pressure-sensitive touch method for the touch screen according to claim 1, comprising:

sensing a touch signal of the touch action occurring in the touch sensing area, to obtain touch information of the touch action;

scanning a first value of the electrical signal of a respective one of the photosensitive devices located in a region where the touch signal occurs when the touch signal occurs;

continuously scanning a current value of the electrical signal of the photosensitive device located in the region where the touch signal occurs, obtaining a change amount of the current value of the electrical signal relative to the first value, and obtaining pressure information of the touch action according to the change amount; and sending the touch information and the pressure information to a controller, and outputting a corresponding control command by the controller.

7. The method of claim 6, wherein:

the touch information comprises at least one of a touch position, a touch duration, or a touch gesture; and the pressure information at least comprises a pressure strength.

8. The method of claim 6, wherein obtaining a change amount of the current value of the electrical signal relative to the first value further comprises:

performing a difference operation between the current value of the electrical signal and the first value, and taking a result of the difference operation as the change amount.

9. The method of claim 6, wherein sensing a touch signal of the touch action occurring in the touch sensing area further comprises:

sensing a capacitance value of each sensing unit in the touch sensing area under a condition in which there is no touch signal in the touch sensing area, and taking the capacitance value as a first capacitance value; and determining whether the touch signal has occurred in the touch sensing area according to a change of a current capacitance value relative to the first capacitance value of each sensing unit in the touch sensing area.

10. The method of claim 9, wherein determining whether the touch signal has occurred in the touch sensing area according to a change of a current capacitance value relative to the first capacitance value of each sensing unit in the touch sensing area further comprises:

determining that there is no touch signal in the touch sensing area if the current capacitance value of each sensing unit in the touch sensing area is unchanged relative to the first capacitance value; and determining that the touch signal has occurred in a certain sensing unit of the touch sensing area if the current capacitance value of the certain sensing unit in the touch sensing area decreases relative to the first capacitance value.

11. A display apparatus, comprising the touch screen of claim 1.

* * * * *